United States Patent
US 8,601,599 B2
Park
Dec. 3, 2013

(54) PLATFORM SECURITY APPARATUS AND METHOD THEREOF

(75) Inventor: Jae-choon Park, Seoul (KR)

(73) Assignee: Pantech Co., Ltd., Seoul (KR)

( * ) Notice: Subject to any disclaimer, the term of this patent is extended or adjusted under 35 U.S.C. 154(b) by 348 days.

(21) Appl. No.: 12/852,685

(22) Filed: Aug. 9, 2010

(65) Prior Publication Data

US 2011/0067097 A1 Mar. 17, 2011

(30) Foreign Application Priority Data

Sep. 16, 2009 (KR) .................. 10-2009-0087594

(51) Int. Cl.
*G06F 7/04* (2006.01)
*H04L 29/06* (2006.01)

(52) U.S. Cl.
USPC .............. 726/27; 726/19; 726/26; 713/159; 713/160; 713/165

(58) Field of Classification Search
USPC ............... 726/19, 26, 27; 713/159, 160, 165
See application file for complete search history.

(56) References Cited

U.S. PATENT DOCUMENTS

| | | | |
|---|---|---|---|
| 5,283,830 A * | 2/1994 | Hinsley et al. ................... 1/1 |
| 6,918,036 B1 | 7/2005 | Drews | |
| 7,490,329 B2 * | 2/2009 | Lefevre et al. .............. 719/311 |
| 7,496,922 B2 * | 2/2009 | Muramatsu et al. ......... 719/312 |
| 8,015,116 B2 * | 9/2011 | Crandell ...................... 705/64 |
| 2002/0038194 A1 * | 3/2002 | Klimberg et al. ............ 702/173 |
| 2002/0040936 A1 | 4/2002 | Wentker et al. | |
| 2004/0204003 A1 * | 10/2004 | Soerensen et al. .......... 455/550.1 |
| 2005/0033983 A1 * | 2/2005 | Takekawa et al. ............ 713/200 |
| 2007/0118558 A1 | 5/2007 | Kahandaliyanage | |
| 2007/0136465 A1 * | 6/2007 | Fernandes et al. ............. 709/225 |
| 2010/0100946 A1 * | 4/2010 | Hallam-Baker .................. 726/5 |
| 2010/0279665 A1 * | 11/2010 | Hardin et al. ............... 455/414.1 |

FOREIGN PATENT DOCUMENTS

| | | |
|---|---|---|
| CN | 1305151 | 7/2001 |
| CN | 1514354 | 7/2004 |
| CN | 1591392 | 3/2005 |
| CN | 1656450 | 8/2005 |
| EP | 1326396 | 7/2003 |
| EP | 1505470 | 2/2005 |
| JP | 2002344623 | 11/2002 |

(Continued)

OTHER PUBLICATIONS

Extended European Search Report of EP 10 17 0248 issued on Feb. 25, 2011.

(Continued)

*Primary Examiner* — Mohammad W Reza
(74) *Attorney, Agent, or Firm* — H.C. Park & Associates, PLC (57) ABSTRACT

A platform security apparatus and a method thereof are capable of protecting a mobile communication terminal from an abnormal or unintended operation of an application program installed over a platform of the mobile communication terminal. An authentication key is created with respect to each function of an application program, and the authentication key and an identifier of the application program are associated with each other and stored. An authentication process is performed by comparing an authentication key and an identifier of an application program registered as function parameters with an authentication key and an identifier of the application program which have been stored, when the application program calls the function.

14 Claims, 6 Drawing Sheets

(56) References Cited

FOREIGN PATENT DOCUMENTS

| | | |
|---|---|---|
| KR | 1019980042974 | 8/1998 |
| KR | 1020020005127 | 1/2002 |
| KR | 1020030070450 | 8/2003 |
| KR | 1020040048144 | 6/2004 |
| KR | 1020060030611 | 4/2006 |
| KR | 1020070033709 | 3/2007 |
| KR | 1020070059891 | 6/2007 |
| KR | 10-2008-0106982 | 12/2008 |
| KR | 10-2009-0061636 | 6/2009 |
| KR | 10-2009-0094362 | 9/2009 |

OTHER PUBLICATIONS

Third Notification of Office Action and Search Report issued in CN 201010282875.7, dated Jul. 19, 2013.

* cited by examiner

| APP_NAME (301) | FUNCTION_NAME | AUTHENTICATION KEY (302) |
|---|---|---|
| APP_1 | FUNCTION_a | $K_{a1}$ |
| | FUNCTION_b | $K_{b1}$ |
| APP_2 | FUNCTION_a | $K_{a2}$ |
| | FUNCTION_c | $K_{c1}$ |
| | FUNCTION_d | $K_{d1}$ |
| APP_3 | FUNCTION_c | $K_{c2}$ |
| | FUNCTION_e | $K_{e1}$ |
| ⋮ | ⋮ | ⋮ |

FIG.4

| | | |
|---|---|---|
| CODES RELATED TO FUNCTION_a | $K_{a1}$ | APP_1 |
| CODES RELATED TO FUNCTION_b | $K_{b1}$ | APP_1 |

411

| | | |
|---|---|---|
| CODES RELATED TO FUNCTION_a | $K_{a2}$ | APP_2 |
| CODES RELATED TO FUNCTION_c | $K_{c1}$ | APP_2 |
| CODES RELATED TO FUNCTION_d | $K_{d1}$ | APP_2 |

412

401 (top brace over table) / 402 (bottom brace under table)

PLATFORM SECURITY APPARATUS AND METHOD THEREOF

CROSS REFERENCE TO RELATED APPLICATION

This application claims priority from and the benefit under 35 U.S.C. §119(a) of Korean Patent Application No. 10-2009-0087594, filed on Sep. 16, 2009, which is hereby incorporated by reference for all purposes as if fully set forth herein.

BACKGROUND

1. Field

The following description relates to a technology of protecting a mobile communication terminal from an abnormal or unintended operation of an application program installed over a platform of the mobile communication terminal.

2. Description of the Related Art

Generally, a platform refers to system environment including a framework for executing application programs. Recently, in order to supply various and advantageous services to a user, an open platform has been introduced.

For example, like the App Store provided by Apple Inc., numerous developers can upload applications developed according to open platform protocols onto a site having functions similar to those of the App Store, and users can freely download applications from the site for free or by paying a small fee to install the application. Thus, the users can be provided with the various functions and services.

Although such an open service environment may provide users with various services and functions, the open service environment may cause user information to become exposed and cause virus infection and fatal system defects due to malicious applications.

In other words, since applications can call all functions of an application program interface (API) of the open platform, the leakage of user information or abnormal charging may be caused. For example, a user may install a malicious application pretending to have only an alarm function. However, when the malicious application is executed, or after the malicious application has been installed, the malicious application may call a platform API enabling access to the address book of the user to acquire the list of the address book without the knowledge of the user, and then call a platform API enabling access to a network, thereby leaking the information of the address book.

SUMMARY

Exemplary embodiments provide a platform security apparatus and a method thereof capable of protecting a mobile communication terminal from the abnormal operation or the unintended operation of an application program installed over a platform of the mobile communication terminal.

Additional features of the invention will be set forth in the description which follows, and in part will be apparent from the description, or may be learned by practice of the invention.

An exemplary embodiment provides a mobile platform security apparatus including an authentication key creating module to create an authentication key for a function of an application program, an authentication information storing module to store the authentication key of the function of the application program and an identifier of the application program, an authentication information registering module to register the authentication key of the function of the application program and the identifier of the application program as function parameters, and an authentication processing module to compare the identifier of a called application program and the authentication key of a called function of the called application program registered as the function parameters with the identifier of the called application program and the authentication key of the called function of the called application program stored in the authentication information storing module.

An exemplary embodiment provides a mobile platform security method including creating an authentication key for a function of an application program, storing the authentication key of the function of the application program and an identifier of the application program, registering the authentication key of the function of the application program and the identifier of the application program as function parameters, and performing an authentication process by comparing the identifier of a called application program and the authentication key of a called function of the called application program registered as the function parameters with the stored identifier of the called application program and the stored authentication key of the called function of the called application program.

It is to be understood that both the foregoing general description and the following detailed description are exemplary and explanatory and are intended to provide further explanation of the invention as claimed. Other features and aspects will be apparent from the following detailed description, the drawings, and the claims.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION

The invention is described more fully hereinafter with reference to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

Figure 1:
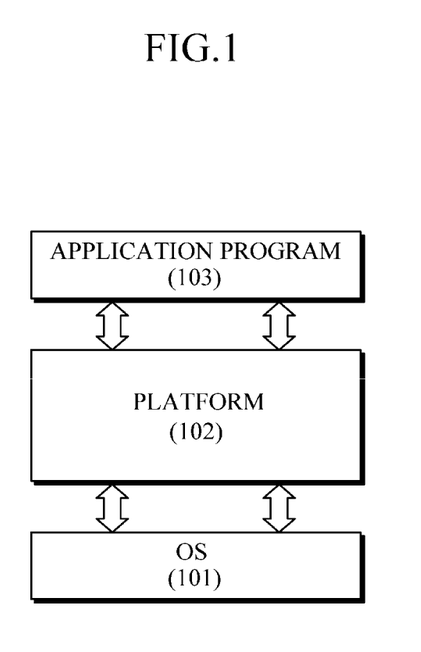
FIG. 1 is a view showing a platform according to an exemplary embodiment of the present invention.

FIG. 1 is a view showing a platform 102 according to an exemplary embodiment of the present invention. As shown in FIG. 1, the platform 102 may be a software hierarchy to provide an environment for executing an application program 103 installed over the platform 102. The application program 103 installed over the platform 102 is made by using an application program interface (API) supplied from the platform 102.

The API refers to a set of sub-routines or functions called by an application program 103 to perform a process in relation to an operating system. In other words, the API is a set of functions defining a scheme suitable for utilizing an operating system (OS) 101.

Accordingly, the application program 103 developed according to a specific protocol of the platform 102 can be executed without direct connection with the OS 101. In other words, the application program 103 can call the API of the platform 102 to access a file or a data area managed by the OS 101, thereby performing an operation.

Figure 2:
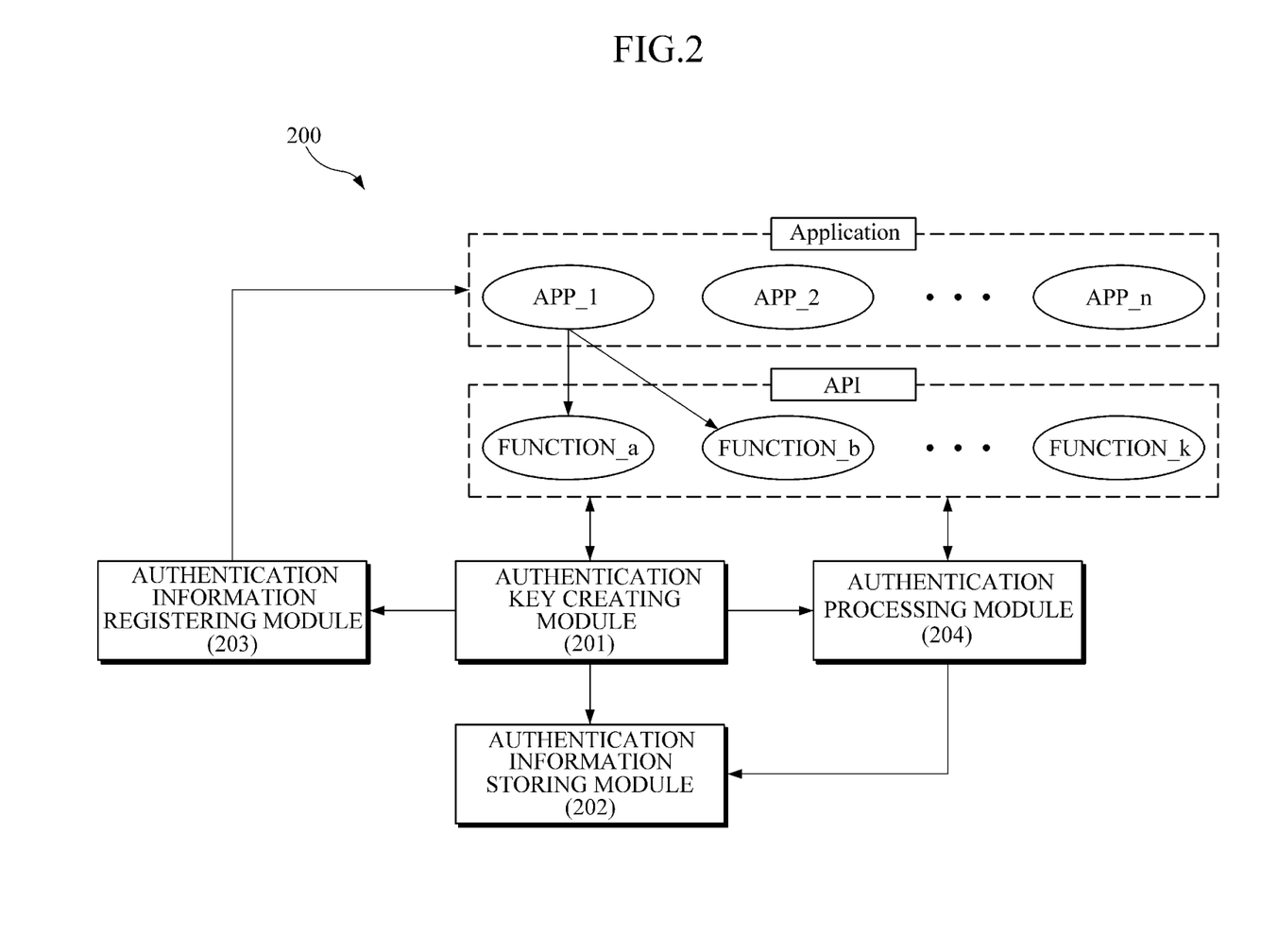
FIG. 2 is a view showing a platform security apparatus according to an exemplary embodiment of the present invention.

FIG. 2 is a view showing a platform security apparatus 200 according to an exemplary embodiment of the present invention. As shown in FIG. 2, the platform security apparatus 200 may be provided in a platform core of a mobile platform installed in a mobile communication terminal. When a specific application program performs a plurality of functions, the platform security apparatus 200 restricts the execution of some functions that are not authenticated by the user. For example, the platform security apparatus 200 can prevent a malicious application, which pretends to provide only an alarm function in the mobile communication terminal, from calling an API enabling the access to an address book of the user to read the address book and leak the information of the address book.

The platform security apparatus 200 may include an authentication key creating module 201, an authentication information storing module 202, an authentication information registering module 203, and an authentication processing module 204.

The authentication key creating module 201 creates an authentication key for each function of an application program. The function of the application program may refer to a function of an API called when the application program is running. For example, if functions function_a and function_b are called when an application program APP_1 is running, the functions function_a and function_b may be the functions of the application program APP_1.

Accordingly, the authentication keys can be created with respect to each function of a platform API provided in the platform 102. For example, if the application APP_1 is installed, the authentication key creating module 201 analyzes code of the application program APP_1 to create an authentication key $K_{a1}$ corresponding to the function function_a, and an authentication key $K_{b1}$ corresponding to the function function_b.

An authentication key can be created when an application program is installed or when a user selects the creation of the authentication key from an option menu. The authentication key may be the combination of several numbers. Further, authentication keys may be independently created according to functions or operations in order to avoid redundancy.

The authentication information storing module 202 stores authentication keys and identifiers of application programs.

As shown in FIG. 2, the identifiers of the application programs may be represented as "APP_1" and "APP_2". For example, the identifiers of the application programs may be the names of the application programs. The authentication keys and the identifiers of the application programs associated with each other are stored in the form of a table.

In other words, the authentication information registering module 203 registers authentication keys and an identifier of an application program as function parameters of the application programs such that the function parameters include the authentication key and the identifier of the application program if the application program calls a function from the API. For example, the authentication information registering module 203 may record the authentication key and the identifier of the application program in a specific data area related to the code area in which the application program is installed.

If an authentication key and an identifier of an application program are added to the function parameters by the authentication information registering module 203, the application program calls a function of the API by using the function parameters including the authentication key and the identifier of the application program. If a specific function is called by the application program, the authentication processing module 204 performs an authentication process by comparing the authentication key and the identifier of the application program serving as the function parameters as registered by the authentication information registering module 203 with an authentication key and an identifier of the application program stored in the authentication information storing module 202.

According to the authentication process, if the authentication key and the identifier of the application program serving as the function parameter and registered by the authentication information registering module 203 are identical to the authentication key and the identifier of the application program stored in the authentication information storing module 202, the application program is allowed access to the called function. If the authentication key and the identifier of the application program serving as the function parameter and registered by the authentication information registering module 203 are different from the authentication key and the identifier of the application program stored in the authentication information storing module 202, the application program is denied access to the called function.

For example, when the application program APP_1 attempts to call a function function_c that is not authenticated, or to perform a specific operation related to the function function_c, the application program APP_1 may attempt to access the function function_c by using a self-created key. However, since the authentication information storing module 202 has no authentication key corresponding to the application program APP_1 and the function function_c, the authentication processing module 204 may prevent the application program APP_1 from accessing the function function_c. Accordingly, an application program can be prevented from independently performing an operation that is not intended by a user.

Figure 3:
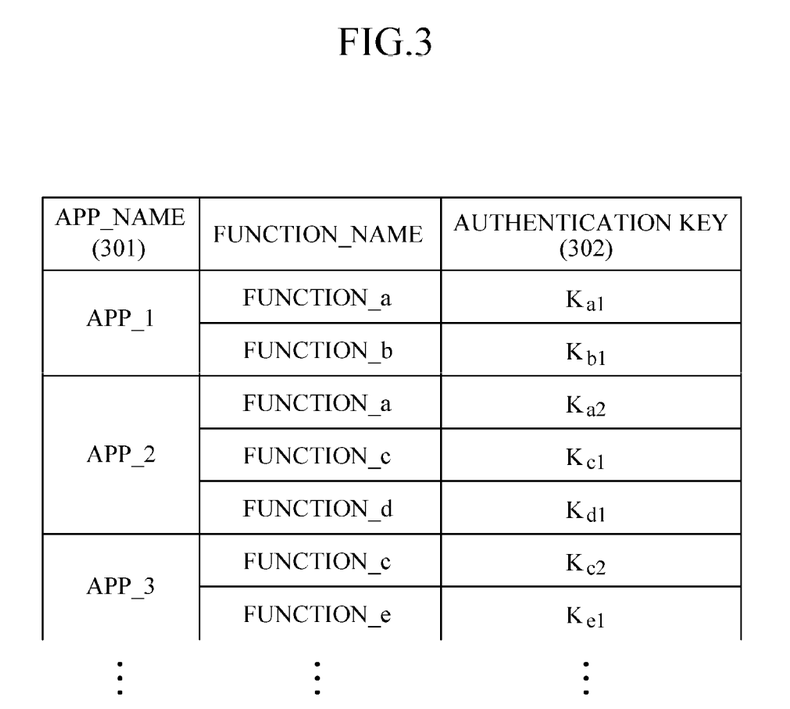
FIG. 3 is a view showing a scheme of storing authentication information according to an exemplary embodiment of the present invention.

FIG. 3 is a view showing a scheme of storing authentication information according to an exemplary embodiment of the present invention. FIG. 3 shows an example of information stored in the authentication information storing module 202. As shown in FIG. 3, APP_NAME 301 represents names of application programs, and authentication key 302 represents an authentication key created for each function. Referring to FIG. 3, each authentication key 302 corresponds to one function of the application program.

For example, even if both the application programs APP_1 and APP_2 use the function function_a, the function function_a of the application program APP_1 is assigned an authentication key $K_{a1}$, and the function function_a of the application program APP_2 is assigned the authentication $K_{a2}$. As described above, the names of the application programs and the authentication keys associated with each other are stored in the authentication information storing module 202.

Figure 4:
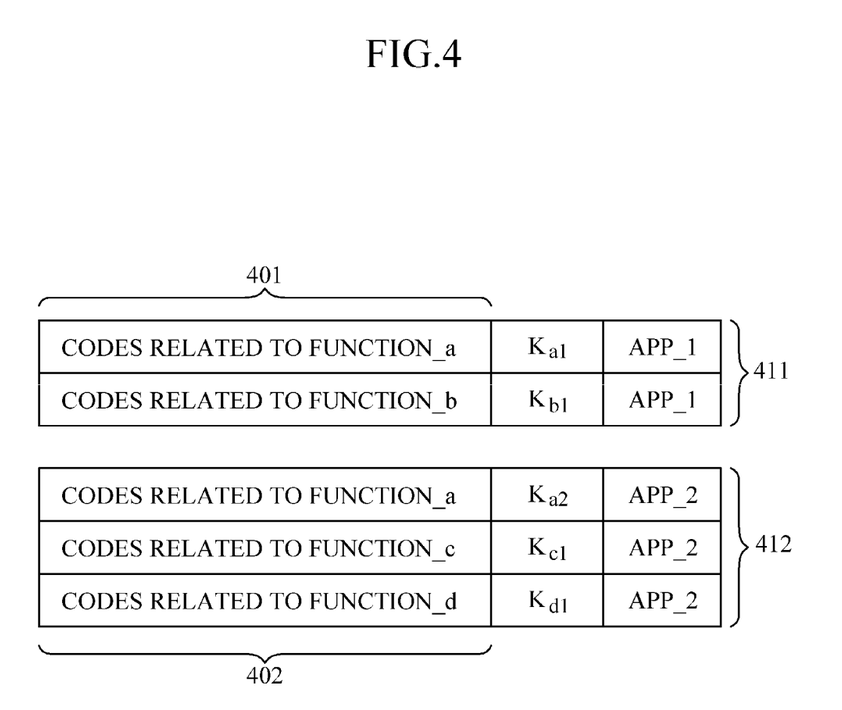
FIG. 4 is a view showing a scheme of registering function parameters according to an exemplary embodiment of the present invention.

FIG. 4 is a view showing a scheme of registering function parameters according to an exemplary embodiment of the present invention. FIG. 4 shows an example in which the authentication key created by the authentication information registering module 203 is provided as a function parameter of an application program.

As shown in FIG. 4, data area 401 is a data area in which the application program APP_1 is installed, and data area 402 is a data area in which the application program APP_2 is installed. Function parameters 411 and 412 are authentication keys and identifiers of application programs APP_1 and APP_2, respectively, registered as function parameters thereof. The authentication information registering module 203 may record the authentication keys and the identifiers 411 and 412 of the application programs APP_1 and APP_2, respectively, in the data areas 401 and 402 related to the code area in which the application programs APP_1 and APP_2 are installed. Since the name of an application program can be recognized by using a return address of an API call, the identifier of the application program can be registered by storing the positions of codes of the application program.

Figure 5:
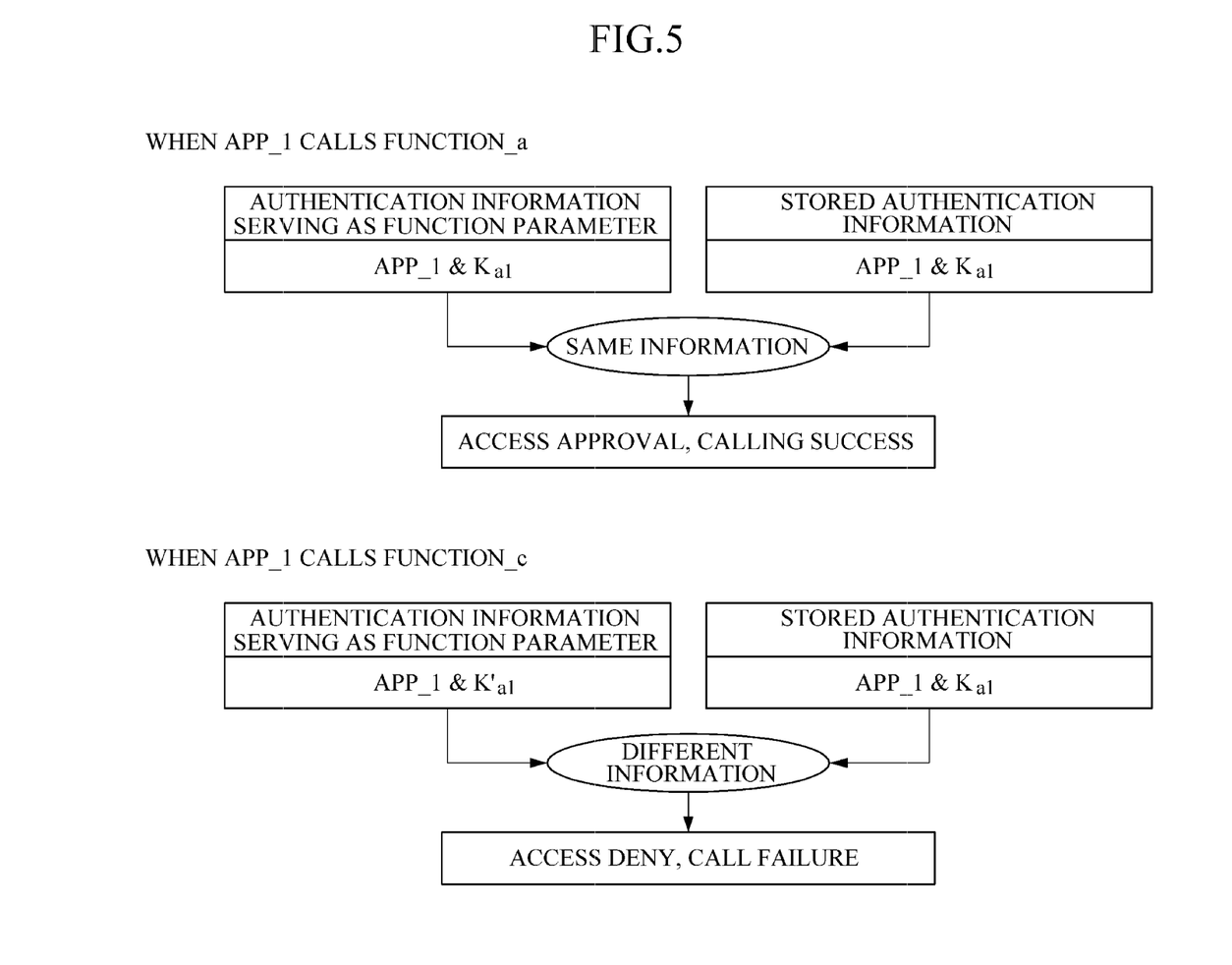
FIG. 5 is a view showing an authentication processing procedure according to an exemplary embodiment of the present invention.

FIG. 5 is a view showing an authentication processing procedure according to an exemplary embodiment of the present invention. FIG. 5 shows an example of the operation of the authentication processing module 204.

For example, authentication information may be stored as shown in FIG. 3, and the authentication information may be registered as a function parameter as shown in FIG. 4. The application program APP_1 may use the functions function_a and function_b.

As shown in FIG. 5, when the application program APP_1 calls the function function_a, the function parameters of the function function_a may include "APP_1", which is the name of the application program, and the authentication key $K_{a1}$, both of which are registered by the authentication information registering module 203. The authentication processing module 204 receives "APP_1" and the authentication key $K_{a1}$ of the function parameters and searches "APP_1" and the authentication key $K_{a1}$ in the authentication information storing module 202. Because the "APP_1" and the authentication key $K_{a1}$ of the function parameters matches the "APP_1" and the authentication key $K_{a1}$ in the authentication information storing module 202, the authentication processing module 204 allows the application program APP_1 to call the function function_a so that the function function_a can be executed.

As shown in FIG. 5, when APP_1 calls function_c, the function parameter may include "APP_1", which is the name of an application program and a fake authentication key $K'_{a1}$. The authentication processing module 204 receives the function parameters as the "APP_1" and the fake authentication key $K'_{a1}$ and searches the "APP_1" and the fake authentication key $K'_{a1}$ in the authentication information storing module 202. Since the fake authentication key $K'_{a1}$ is not matched with the "APP_1" in the authentication information storing module 202, the authentication processing module 204 determines the call of the function function_c by the application program APP_1 as a failure and blocks the function function_c from being executed.

When function execution is blocked, function access may be permanently blocked through user identification or function access may be approved through a re-authentication process.

Figure 6:
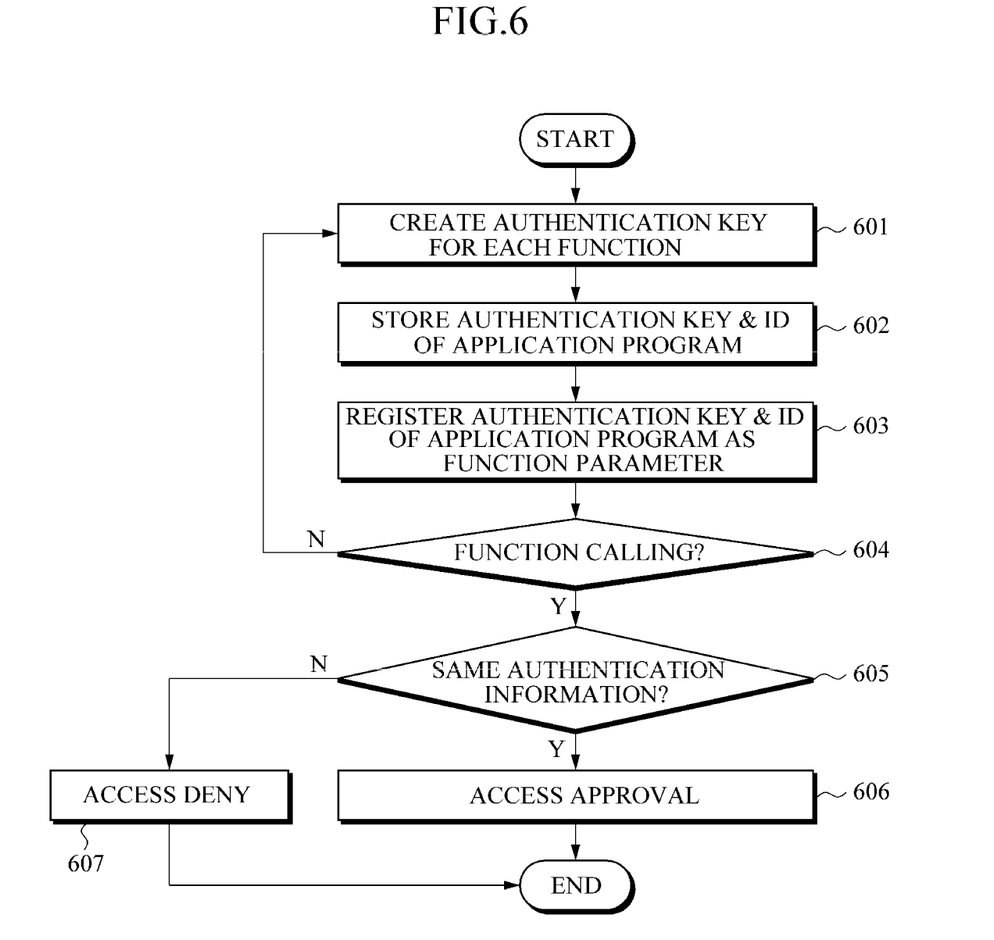
FIG. 6 is a flowchart showing a mobile platform security method according to an exemplary embodiment of the present invention.

FIG. 6 is a flowchart showing a mobile platform security method according to an exemplary embodiment of the present invention. Hereinafter, a mobile platform security method according to an exemplary embodiment of the present invention will be described with reference to FIG. 6. In operation 601, authentication keys of an application program are created for each function of the application program. For example, when the application program is installed, or an instruction is received through an option menu, the authentication key can be created for each function of a platform API.

In operation 602, the authentication key and an identifier of the application program are stored. For example, the authentication key and the identifier of the application program associated with each other are stored in the authentication information storing module 202 in the form of a table shown in FIG. 3.

In operation 603, the authentication key and the identifier of the application program are registered as function parameters such that the application program calls a specific function by using the function parameters including the authentication key and the identifier of the application program. For example, the authentication information registering module 203 can register the authentication key and the identifier of the application program in the specific data area related to a code area in which the application program is installed as shown in FIG. 4.

If the specific function is called in operation 604, then in operation 605, the authentication key and the identifier of the application program is compared with an authentication key and an identifier of the application program that has been stored in operation 602. For example, the authentication processing module 204 may receive the function parameters including the authentication key and the identifier of the application program from the application program or the API function. Then, the authentication processing module 204 searches the authentication information storing module 202 for an authentication key and the identifier of the application program identical to the received authentication key and the received identifier of the application program.

As a result of the comparison, if the received authentication key and the received identifier of the application program are identical to the searched authentication key and the searched identifier that exist in the authentication information storing module 202, access to the called function is allowed in operation 606. Otherwise, access to the called function is denied in operation 607.

Accordingly, an application program can be executed only with respect to functions that are authenticated Meanwhile, exemplary embodiments of the present invention can be realized as codes, which can be read by a computer, in storage media that can be read by the computer. The storage media that can be read by the computer includes all kinds of recording devices that store data that can be read by the computer. For example, the storage media that can be read by a computer includes ROMs, RAMs, CD-ROMs, magnetic tapes, floppy-disks, and optical data storing units. The storage media, which can be read by a computer, may store and execute codes which are distributed in computer systems connected with each other through a network and read by the computer through a distribution scheme. Functional programs, codes, and code segments used to realize exemplary embodiments of the present invention can be easily derived by those skilled in the art.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A mobile platform security apparatus, comprising:
an authentication key creating module to create an authentication key for a function of an application program;
an authentication information storing module to store the authentication key of the function of the application program and an identifier of the application program;
an authentication information registering module to register the authentication key of the function of the application program and the identifier of the application program as function parameters; and
an authentication processing module to compare the identifier of a called application program and the authentication key of a called function of the called application program registered as the function parameters with the identifier of the called application program and the authentication key of the called function of the called application program stored in the authentication information storing module.

2. The mobile platform security apparatus of claim 1, wherein the authentication processing module approves access to the called function if the authentication key of the called function and the identifier of the called application program registered as the function parameters are respectively identical to the authentication key of the called function and the identifier of the called application program stored in the authentication information storing module, and
wherein the authentication processing module denies access to the called function if the authentication key of the called function and the identifier of the called application program registered as the function parameters are respectively different from the authentication key of the called function and the identifier of the called application program stored in the authentication information storing module.

3. The mobile platform security apparatus of claim 1, wherein the authentication key of the function of the application program is created if the application program is installed or if an instruction to create the authentication key is received through.

4. The mobile platform security apparatus of claim 1, wherein the authentication key is created for a function of a platform application program interface.

5. The mobile platform security apparatus of claim 1, wherein the authentication information registering module registers the authentication key and the identifier of the application program as the function parameters by recording the authentication key and the identifier of the application program in a specific data area related to a code area in which the application program is installed.

6. The mobile platform security apparatus of claim 1, wherein the authentication key creating module analyzes code of the application program to create the authentication key for the function of the application program.

7. The mobile platform security apparatus of claim 2, wherein if the authentication processing module denies access to the called function, function access is permanently blocked or function access may be approved through a re-authentication process of the function of the application program.

8. A mobile platform security method, comprising:
creating an authentication key for a function of an application program;
storing the authentication key of the function of the application program and an identifier of the application program;
registering the authentication key of the function of the application program and the identifier of the application program as function parameters; and
performing an authentication process by comparing the identifier of a called application program and the authentication key of a called function of the called application program registered as the function parameters with the stored identifier of the called application program and the stored authentication key of the called function of the called application program.

9. The mobile platform security method of claim 8, wherein the performing of the authentication process comprises:
approving access to the called function if the authentication key of the called function and the identifier of the called application program registered as the function parameters are respectively identical to the stored authentication key of the called function and the stored identifier of the called application program, and
denying access to the called function if the authentication key of the called function and the identifier of the called application program registered as the function parameters are respectively different from the stored authentication key of the called function and the stored identifier of the called application program.

10. The mobile platform security method of claim 8, wherein the authentication key of the function of the application program is created if the application program is installed or if an instruction to create the authentication key is received.

11. The mobile platform security method of claim 8, wherein the authentication key is created for a function of a platform application program interface.

12. The mobile platform security method of claim 8, wherein the registering of the authentication key of the function of the application program and the identifier of the application program as the function parameters comprises recording the authentication key and the identifier of the application program in a specific data area related to a code area in which the application program is installed.

13. The mobile platform security method of claim 8, wherein the creating of the authentication key for the function of the application program comprises:
analyzing code of the application program to create the authentication key for the function of the application program.

14. The mobile platform security method of claim 9, wherein, if access to the called function is denied, function access is permanently blocked or function access may be approved through a re-authentication process of the function of the application program.